March 5, 1935.  J. M. McCONNELL, JR  1,993,069
AUTOMATIC DAMPER
Filed May 7, 1934
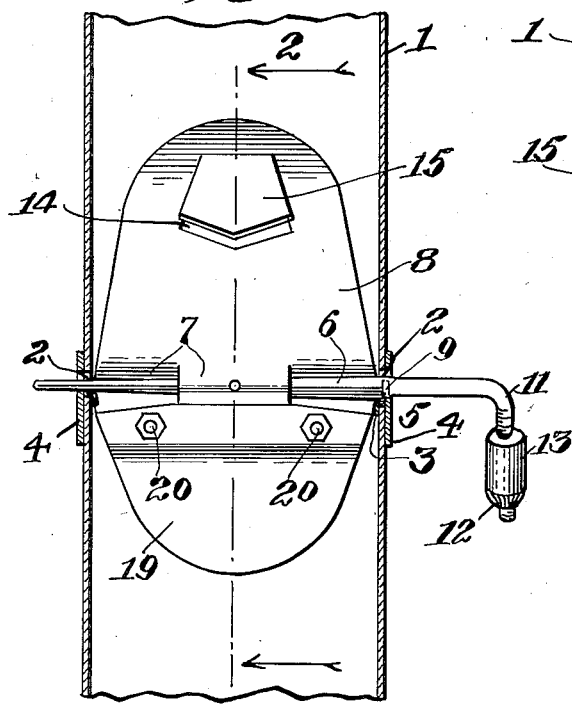
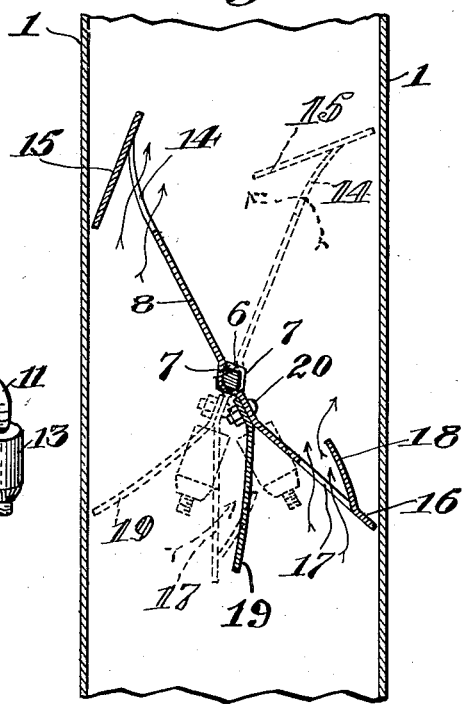
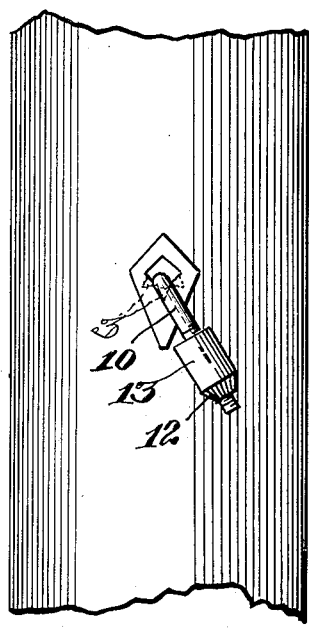
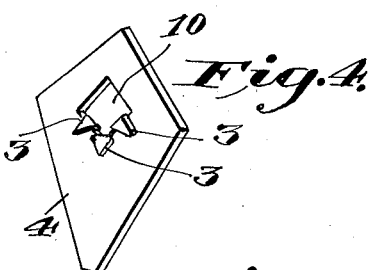
Inventor
JAMES M. McCONNELL, JR.
By E. E. Vrooman & Co,
His Attorneys Patented Mar. 5, 1935

1,993,069

UNITED STATES PATENT OFFICE 1,993,069

AUTOMATIC DAMPER

James M. McConnell, Jr., Snowflake, Va., assignor, by direct and mesne assignments, of one-fourth to Harvey W. Culbertson, Gate City, Va., and one-fourth to Walter Gilliland, Bozeman, Mont.

Application May 7, 1934, Serial No. 724,391

4 Claims. (Cl. 137—152)

This invention relates to an automatic damper for stoves, furnaces, etc.

An object of my invention is the provision of a simple and efficient damper device which will automatically control the draft through a pipe or similar unit of a stove, furnace, etc.

Another object of the invention is the construction of a novel sheet metal body of a damper which will be susceptible of positioning in a pipe so that it will automatically balance therein to control the draft through the pipe depending upon the condition of the fire in the stove, furnace, etc.

With the foregoing and other objects in view, my invention comprises certain novel constructions, combinations and arrangements of parts as will be hereinafter fully described, illustrated in the accompanying drawing, and more particularly pointed out in the appended claims.

In the drawing:

Figure 1 is a vertical, central sectional view through a pipe, showing in elevation a device constructed in accordance with the present invention.

Figure 2 is a sectional view taken on line 2—2, Figure 1, and looking in the direction of the arrows.

Figure 3 is a view in elevation of a part of a pipe, showing my device applied thereto.

Figure 4 is a perspective view of one of the bearing plates.

Figure 5 is a fragmentary perspective view of the supporting shaft.

Referring to the drawing by numerals, 1 designates the pipe of any suitable structure. In the pipe, and in horizontal alignment, I form two apertures 2, and through these apertures, I place the prongs 3 of the supporting plates 4, hooking the prongs on the edge of the openings 10, whereby the bearing plates are held in position on the side of the pipe.

A supporting shaft 5 is provided with a central portion 6 that is angular in cross section, and this central portion tapers wedge-like to prevent it from going too far through the socket which is formed by the bent out portions 7 (Fig. 1) of the sheet metal body 8; see also Fig. 2 for this structure. The supporting shaft has a locking notch 9 which rests in one of the openings 10 of a bearing plate 4. This locking notch 9 assists in keeping the supporting shaft in correct position upon the pipe 1. The supporting shaft is bent downwardly at 11, and is screw threaded, upon which portion is mounted nut 12. Against nut 12 bears a loosely mounted weight 13. By adjusting nut 12, the "balance" of the damper can be accurately maintained.

The body 8 is preferably formed from sheet metal and is bent or curved as particularly shown in Fig. 2. In the upper portion of body 8 I form an opening 14 by cutting out an upper fin 15. This fin 15 extends outwardly, as shown. The lower outwardly flared or bent portion 16 of body 8 is also provided with an opening 17 formed by cutting out the lower fin 18. These openings 14 and 17 constitute outlet ports for the smoke, heat and gases to pass through, as hereinafter described. An outwardly flared plate 19 is fastened by bolts 20 to the body 6 beneath shaft 5, and this plate is flared outwardly, whereby I have produced a damper body that is substantially an inverted Y-shape structure, which materially assists in automatically controlling the draft through the pipe or flue in which the damper device is mounted.

In operation the damper device is placed in the pipe or flue 1, as shown, and it normally rests in the position shown in Fig. 2, while the fire is dead or when it is first started. Then such gases as may be in the pipe pass up through outlet openings 14 and 17 and as the fire increases, especially during the starting of the same, the body 8 gradually assumes a perpendicular position by reason of its automatic balance, allowing free passage of smoke and gases through the pipe. Then as the fire increases, and becomes extremely hot, it is desired to retard the free burning to save material, as well as to cut down the heat power when desired, the body swings to the dotted position in Fig. 2, practically closing the pipe except that the gases will be permitted to pass out, through the openings or ports 14 and 17 as shown by the dotted arrows in Fig. 2. Therefore, by reason of my peculiar and novel device, no gases or smoke enter the room or building, either when the fire is being started, or burning at a maximum, or when the fire is cut off, so to speak. The damper device acts automatically to fully and efficiently control the draft; this I have found to be true from extensive experience with a full size working device.

While I have described the preferred embodiment of my invention and illustrated the same in the accompanying drawing, certain minor changes or alterations may appear to one skilled in the art to which this invention relates, during the extensive manufacture of the same, and I therefore, reserve the right to make such changes or alterations as shall fairly fall within the scope of the appended claims.

What I claim is:

1. In a device of the class described, the combination with a pipe or the like, of a damper device in said pipe, said damper device comprising a body provided near its upper end with an opening and a fin, and provided near its lower end with an opening and a fin.

2. In a device of the class described, the combination with a pipe or the like, of a damper device in said pipe, said damper device comprising a body with flared portions at its lower end and with an upper portion, an opening in said upper portion, and an opening in one of the flared portions at the lower end.

3. In a device of the class described, the combination with a pipe or the like, of a weighted draft controlled damper device in said pipe, said device provided with outlet openings therethrough and with a double flared body structure at one end.

4. In a device of the class described, the combination with a pipe, of aligned openings on said pipe, bearing plates on the outside of said pipe and provided with prongs in said openings, a sheet metal body in said pipe provided with centrally arranged bent out portions forming a tapering shaft-receiving socket, a shaft extending through said openings and bearing plates, said shaft provided with an adjustable weight on one end, said shaft tapering wedge-like its greater portion and being angular in cross section, said tapering portion positioned in said tapering shaft-receiving socket of the body, said body curved throughout its entire length, said body provided near its upper end with a cut out fin producing an outlet opening under said fin, said body provided near its lower end with a cut out fin producing an outlet opening under the last-mentioned fin, a curved plate detachably secured to said body under said shaft, the lower end of said body and said curved plate extending outwardly in opposite directions, and said curved plate and lower end producing substantially a Y-shape structure.

JAMES M. McCONNELL, Jr.